(12) United States Patent
Hoel et al.

(10) Patent No.: US 12,437,807 B2
(45) Date of Patent: Oct. 7, 2025

(54) STORING AND RETRIEVING ACCESS CONTROL RULES IN AN SOC

(71) Applicant: TEXAS INSTRUMENTS INCORPORATED, Dallas, TX (US)

(72) Inventors: Robin Osa Hoel, Oslo (NO); Aniruddha Periyapatna Nagendra, Bangalore (IN); Prithvi Shankar Yeyyadi Anantha, Bangalore (IN); Shobhit Singhal, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 157 days.

(21) Appl. No.: 18/360,373

(22) Filed: Jul. 27, 2023

(65) Prior Publication Data

US 2025/0037759 A1    Jan. 30, 2025

(51) Int. Cl.
 *G11C 11/413*    (2006.01)
(52) U.S. Cl.
 CPC .................. *G11C 11/413* (2013.01)
(58) Field of Classification Search
 CPC .................................................. G11C 11/413
 USPC .................................................. 365/189.011
 See application file for complete search history.

(56) References Cited

U.S. PATENT DOCUMENTS

| 7,813,161 B2 * | 10/2010 | Luthra ..................... G11C 8/16 365/189.14 |
| 8,296,320 B1 | 10/2012 | Corbett |
| 2018/0158518 A1 * | 6/2018 | Shu ....................... G11C 11/418 |
| 2021/0311884 A1 | 10/2021 | Grocutt |

FOREIGN PATENT DOCUMENTS

EP    1742152 B1    9/2012

OTHER PUBLICATIONS

Anonymous, "Static random-access memory", Wikipedia, Jul. 14, 2023 (Jul. 14, 2023), XP093218065, Retrieved from the Internet: URL:https://en.wikipedia.org/w/index.php?title=Static_random-access_memory&oldid=116 5374568 [retrieved on Oct. 24, 2024] the whole document, 9 pgs.

* cited by examiner

*Primary Examiner* — Amir Zarabian
*Assistant Examiner* — Daniel J King
(74) *Attorney, Agent, or Firm* — Michael T. Gabrik; Frank D. Cimino

(57) ABSTRACT

In an example, a system includes an SRAM configured to store a plurality of access control rules, where each rule is stored in a separate row. The SRAM is configured to store a plurality of context entries, where each context entry is stored in a separate row. The system includes a controller configured to receive a request for an access control rule for a memory location from a first context. The controller is configured to search one or more access control rules for the first context, where access control rules for the first context are stored in a binary tree format. The controller is configured to, responsive to finding the access control rule for the memory location, return the access control rule to the first context. The controller is configured to, responsive to not finding the access control rule, return a null notification to the first context.

23 Claims, 9 Drawing Sheets

STORING AND RETRIEVING ACCESS CONTROL RULES IN AN SOC

BACKGROUND

In a system on a chip (SOC), a global crossbar or interconnect is useful for various bus initiators to access memories in the SOC. The bus initiators are components such as processors, controllers, hardware accelerators, direct memory access (DMA) controllers, or other components that may access the memories. The memories may include random access memory (RAM), read-only memory (ROM), static RAM (SRAM), Flash, or memory in peripheral devices. The bus initiators may each run one or more software contexts that are isolated from one another for security reasons. Each software context has its own set of access permissions for the memories. Rules are stored that manage the access permissions for each software context.

SUMMARY

In accordance with at least one example of the description, a method includes storing a plurality of access control rules in an SRAM, where each rule is stored in a separate row in the SRAM. The method also includes storing a plurality of context entries in the SRAM, where each context entry is stored in a separate row in the SRAM. The method includes receiving a request for an access control rule for a memory location from a first context. The method also includes searching one or more access control rules for the first context, where access control rules for the first context are stored in a binary tree format. The method includes, responsive to finding the access control rule for the memory location, returning the access control rule to the first context. The method also includes, responsive to not finding the access control rule for the memory location, returning a null notification to the first context.

In accordance with at least one example of the description, a system includes an SRAM configured to store a plurality of access control rules, where each rule is stored in a separate row in the SRAM. The SRAM is configured to store a plurality of context entries, where each context entry is stored in a separate row in the SRAM. The system includes a controller configured to receive a request for an access control rule for a memory location from a first context. The controller is also configured to search one or more access control rules for the first context, where access control rules for the first context are stored in a binary tree format. The controller is configured to, responsive to finding the access control rule for the memory location, return the access control rule to the first context. The controller is also configured to, responsive to not finding the access control rule for the memory location, return a null notification to the first context.

In accordance with at least one example of the description, a method includes storing a plurality of access control rules in an SRAM, where each rule is stored in a separate row in the SRAM. The method also includes storing a plurality of context entries in the SRAM, where each context entry is stored in a separate row in the SRAM. The method includes receiving a request for an access control rule for a memory location from a first context. The method also includes searching a first binary tree for one or more access control rules for the first context, where the first binary tree includes access control rules for the first context. The method includes searching a second binary tree for one or more access control rules for the first context, where the second binary tree includes access control rules for a parent entity of the first context. The method also includes searching a third binary tree for one or more access control rules for the first context, where the third binary tree includes shared access control rules for the first context and a second context. The method includes, responsive to finding the access control rule for the memory location, returning the access control rule to the first context. The method includes, responsive to not finding the access control rule for the memory location, returning a null notification to the first context.

In accordance with at least one example of the description, a system includes an SRAM configured to store a plurality of access control rules, where each rule is stored in a separate row in the SRAM. The SRAM is configured to store a plurality of context entries, where each context entry is stored in a separate row in the SRAM. The system includes a controller configured to receive a request for an access control rule for a memory location from a first context. The controller is also configured to search a first binary tree for one or more access control rules for the first context, where the first binary tree includes access control rules for the first context. The controller is configured to search a second binary tree for one or more access control rules for the first context, where the second binary tree includes access control rules for a parent entity of the first context. The controller is also configured to search a third binary tree for one or more access control rules for the first context, where the third binary tree includes shared access control rules for the first context and a second context. The controller is configured to, responsive to finding the access control rule for the memory location, return the access control rule to the first context. The controller is also configured to, responsive to not finding the access control rule for the memory location, return a null notification to the first context.

BRIEF DESCRIPTION OF THE DRAWINGS

The same reference numbers or other reference designators are used in the drawings to designate the same or similar (functionally and/or structurally) features.

DETAILED DESCRIPTION

Software contexts in an SOC may each have their own associated set of access permissions that enable or disable access to peripherals and memories within the SOC. Hardware firewalls at various points in the SOC bus fabric may enforce the rules that determine which contexts can access which peripherals or portions of memory. The firewalls may cache some rules and dynamically request new rules from a centralized rule storage. In some systems, trusted software programs the firewalls.

Examples described herein provide a streamlined method of storing, querying, and retrieving access control rules from a centralized rulebook. A trusted software stores rules within the SRAM for all contexts. Firewalls query the rules for permissions when an access request is received by the firewalls. The rules of the firewalls are dynamically queried from the centralized rulebook.

In some examples herein, access control rules (e.g., access control lists (ACLs)) are efficiently represented in binary format within the rulebook. An SRAM contains the rulebook. A hardware state machine receives access query requests from a context for a specific region in memory from a firewall, and the access rules for the context to access that region are provided to the firewall. Each access rule may specify a type of access or a denial. The storage format for the rules described herein is efficient to allow for quick searching. A hardware state machine may implement an algorithm to fetch the rules from the SRAM. Also, if software sends a query regarding a rule or set of rules (such as which contexts have permission to access a specific region of memory, etc.), some examples herein perform a search and return a response to the query. In some examples, the rulebook is also dynamic, and corresponding systems may modify the rulebook if a rule changes or add rules for a new context.

Some examples herein include the security benefits of a memory management unit (MMU) within a hardware solution. Likewise, some examples herein have a lower memory footprint, finer granularity, and comparable speed compared to alternatives, while adding additional support for software operations, such as query, search, and modification of rules.

Figure 1:
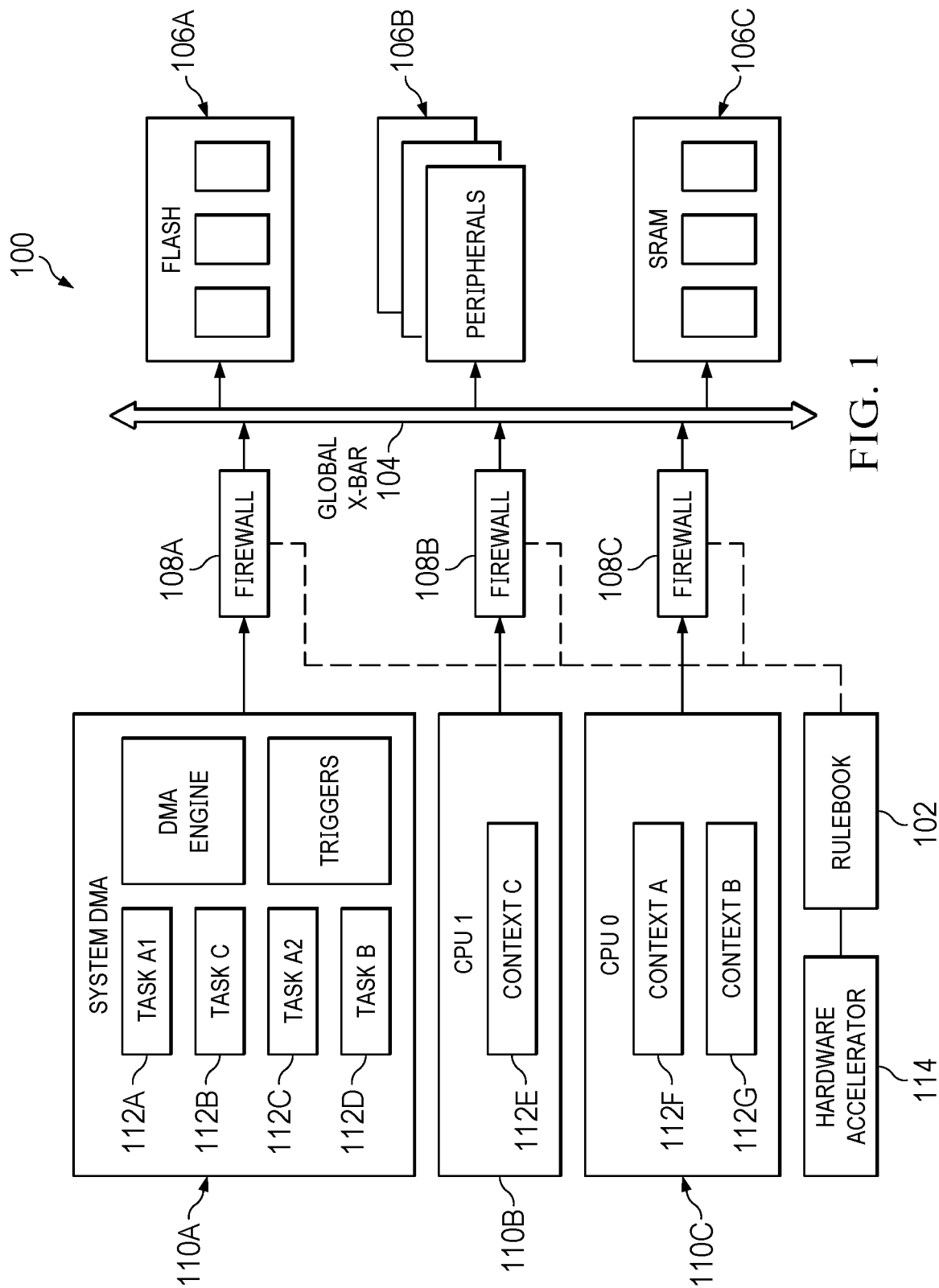
FIG. 1 is a block diagram of a system for storing and retrieving access control rules in an SOC in accordance with various examples.

FIG. 1 is a block diagram of a system 100 for storing and retrieving ACLs in an SOC in accordance with various examples herein. System 100 includes a rulebook 102, a global crossbar 104, and memories 106A, 106B, and 106C (collectively, memories 106, or individually, memory 106). System 100 includes firewalls 108A, 108B, and 108C (collectively, firewalls 108, or individually, firewall 108). System 100 also includes components 110A, 110B, and 110C (collectively, components 110, or individually, component 110). Components 110 may be any device, software program, or bus initiator that requests memory access. Components 110 may include any include any task, contexts, or other requesting entities such as tasks 112A, 112B, 112C, and 112D, or contexts 112E, 112F, and 112G (collectively, requestors 112) in system 100. System 100 also includes hardware accelerator 114.

In examples herein, system 100 may include any number of memories 106, firewalls 108, components 110, or contexts 112. In one example, component 110A is a DMA, and tasks 112A to 112D are provided as example tasks that may make memory access requests. Component 110B is a central processing unit (CPU1) that includes a context 112E. Context 112E may be, for example, a software program that makes memory access requests. Component 110C is a central processing unit (CPU0) that includes contexts 112F and 112B. Contexts 112F and 112G may make memory access requests and may have different permissions from one another for accessing various locations in memory. Both tasks (such as 112A-112D) and contexts (such as 112E-112G), make memory requests, and therefore each may be referred to herein as requestors. Memory requests from DMA tasks are handled similarly to memory requests from contexts as described herein. In some examples, a task may be considered a context. Many of the examples herein describe memory requests from contexts, and those examples are also applicable to memory requests from tasks. Memories 106 may be any type of memory, such as Flash memory (106A), peripheral memory (106B), or SRAM (106C). A firewall 108 may receive memory access requests from any component 110. Firewalls 108 may include circuitry for performing the operations described herein. Firewalls 108 may include software executing on a controller or processor in other examples.

In one example, a context (such as context 112E, or a task such as task 112A) requests write access to a specific region of SRAM 106C. A firewall, such as firewall 108B, receives the request from context 112E. Firewall 108B queries rulebook 102 to determine if context 112E has write access to that specific region of SRAM 106C. Rulebook 102 includes rules that indicate which contexts have access to which regions of memory, and what type of access the context has (read, write, etc.). If context 112E has write access, firewall 108B permits context 112E to access the region of memory in SRAM 106C. If context 112E does not have write access, firewall 108B notifies context 112E that the access is denied. As described below, rulebook 102 provides a streamlined method of storing, querying, and retrieving access control rules (ACLs). Hardware accelerator 114 may manage the operations of rulebook 102, such as querying rules, updating rules, modifying rules, etc.

One aspect of storing rules in rulebook 102 is to represent the rules in a specific format to provide the advantages described herein. The rules may indicate which components, contexts, or tasks have access to which memory ranges, and what type of access that entity has. The representation may be efficient by using as few bits as possible. Three other features of the access control rules may also be present. First, the system may support general memories like SRAM and Flash memory. These types of memories often have a start address and an end address to define a memory region for a given context. Often, for a given context, there is only one ACL rule for a given memory address range, but there are also provisions for allowing overlapping memory regions for some contexts for different permissions. Second, the system may support peripheral memory. Peripheral memory could be a universal serial bus (USB) memory or memory accessed via serial peripheral interface (SPI) or inter-integrated circuit (I²C). Peripheral memories may be assigned in total to one context or requesting entity. However, on the interconnect the peripheral memories are defined using an address range. Ownership of the peripheral memory often applies to the entire peripheral memory range. Peripheral devices may have a fixed size memory mapped region.

Peripheral memories could also have different sizes. In some examples, the peripheral memory can be allocated as a whole. Range-based rules could be useful for peripherals, but that could also waste resources in the peripheral. The systems describe herein provide a method for managing the entire peripheral. Third, SRAM may be allocatable as a block resource (such as 64 kilobyte (kB) sections of memory in an example with a 1 MB base address granularity, or 1 kB sections of memory in an example with 64 kB base address granularity) for dynamic allocation and deallocation from a common pool. Because the SRAM has the sections, start and end addresses may not need to be assigned, and a more efficient representation may be useful. Finally, each rule may be able to specify attributes such as read, write, sharable, execute, etc.

Figure 2:
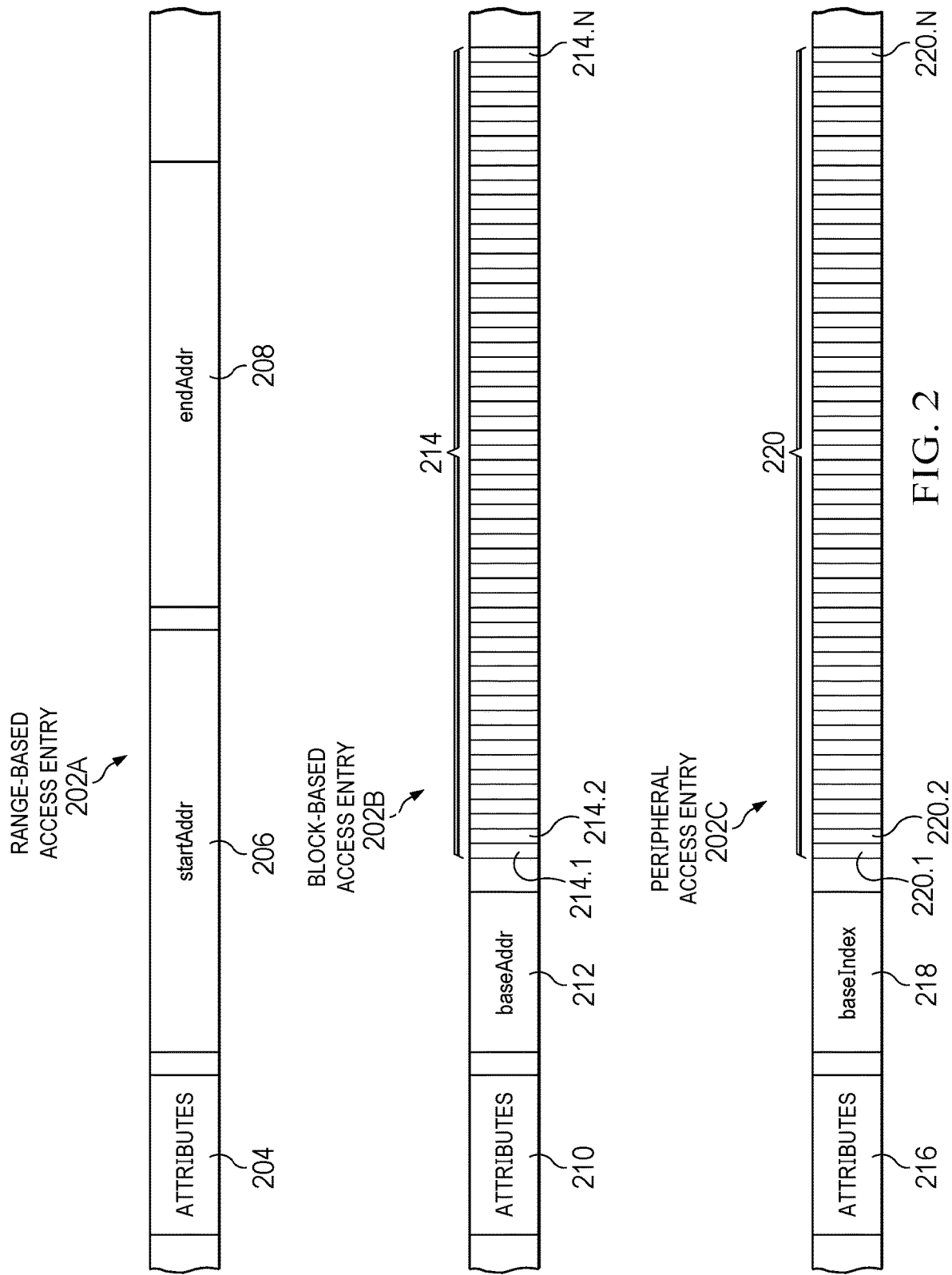
FIG. 2 shows three access rule types in accordance with various examples.

FIG. 2 shows three access rule types in accordance with various examples herein. Rule type 202A is a range-based access entry, rule type 202B is a block-based access entry, and rule type 202C is a peripheral access entry. Rules stored in rulebook 102 may be stored in one of these three formats.

Rule type 202A is a range-based access entry for a contiguous block of memory (e.g., range-based memory locations). A range-based access entry includes attributes 204, a start address (startAddr) 206, and an end address (endAddr) 208.

Rule type 202B is a block-based access entry that is useful for memory allocated in a common pool (e.g., block-based memory locations). The block-based access entry includes attributes 210, a base address (baseAddr) 212, and bitmap 214. Any number of bits in bitmap 214 may be present, such as 214.1, 214.2, . . . 214.N as shown in FIG. 2. Attributes 210 are listed first, and then the base address 212 is a base address for a block of memory, such as a 1 megabyte (MB) block. The block of memory is divided into sections represented by bits 214.1, 214.2, etc., which represent smaller sections of the 1 MB block of memory, such as 64 kB section from the base address of a 1 MB block (or 1 kB sections from the base address of a 64 kB block or any other suitable section and block size). The rule type 202B includes a bitmap such that each entry of bitmap 214 on FIG. 2 includes a bit for consecutive 64 kB sections from the 1 MB base address, up to N 64 kB sections. Each bit having a first value (e.g., 1) indicates that the requesting entity or context has access to that 64 kB section of memory. Each bit having a second value (e.g., 0) indicates that the entity or context does not have access to the respective section. To deallocate access to a specific section of the memory, the bit in the specific section 214.X is assigned the second value. With this scheme, start and end addresses for each 64 kB section do not have to be provided.

Rule type 202C is a peripheral access entry for a peripheral memory. The peripheral access entry includes attributes 216, a base index (baseIndex) 218, and bitmap 220. Any number of entries may be present in bitmap 220, such as 220.1, 220.2, . . . 220.N as shown in FIG. 2. Attributes 216 are listed first, and then base index 218. Entries of bitmap 220 represent respective peripherals. Each peripheral entry is unique, and their sizes could be different, which may be in contrast to the entries of bitmap 214, which may have the same size. Each entry in the bitmap 220 corresponds to a peripheral, and each entry in the bitmap 220 has a bit representing access or no access to that specific peripheral. The hardware or firmware herein tracks which entry of the bitmap 220 corresponds to which peripheral. The context that this rule applies to has access to the specific peripherals designated by the bit entries.

In examples herein, a number of factors may be implemented for storing the rules in rulebook 102. Rulebook 102 may be a part of a specialized hardware accelerator 114 that includes a large memory for storing rules. In other examples, the operations described herein may be performed by a suitable processor or controller. Rulebook 102 implements the procedures described herein to store, query, and retrieve rules. First, all contexts are handled by rulebook 102. Rules for each context are stored in rulebook 102. Second, each context is associated with a specific set of one or more rules that indicate the access privileges that the context has. Third, multiple contexts can share a set of common rules in one example. Examples herein provide an efficient implementation for shared rules to reduce space in the SRAM, rather than storing identical rules multiple times. Fourth, continuous memory accesses are sent from the CPUs, DMAs, contexts, etc., to the firewalls 108. A firewall 108 should not take a long time to decide on the access rules, so the system should be able to find rules quickly in rulebook 102. The firewalls 108 may store or cache some rules themselves, and if the firewall 108 has a rule for a specific access request, the firewall 108 may use that rule. If the firewall 108 does not have a rule, the firewall 108 queries the rulebook 102. After querying the rulebook 102 for a rule, firewall 108 may cache the rule for later use. Rulebook 102 should be fast in searching the stored access rules and providing the rule to firewall 108. Therefore, examples herein provide a quick entry point into rulebook 102 responsive to a request from a firewall 108. The examples herein provide methods for quickly searching the SRAM of rulebook 102 that stores the access control rules.

Fifth, two access rules could have regions that overlap with different permissions, and the systems described herein can handle that scenario. Sixth, the storage scheme should be suitable for an efficient hardware based search and retrieval of the rules. Seventh, a common SRAM of fixed width stores all the access control information for all contexts serially in rows. Each entry in the SRAM of rulebook 102 has the same width in one example. Eighth, the system should be amenable for dynamic rule addition and deletion in hardware.

Figure 3:
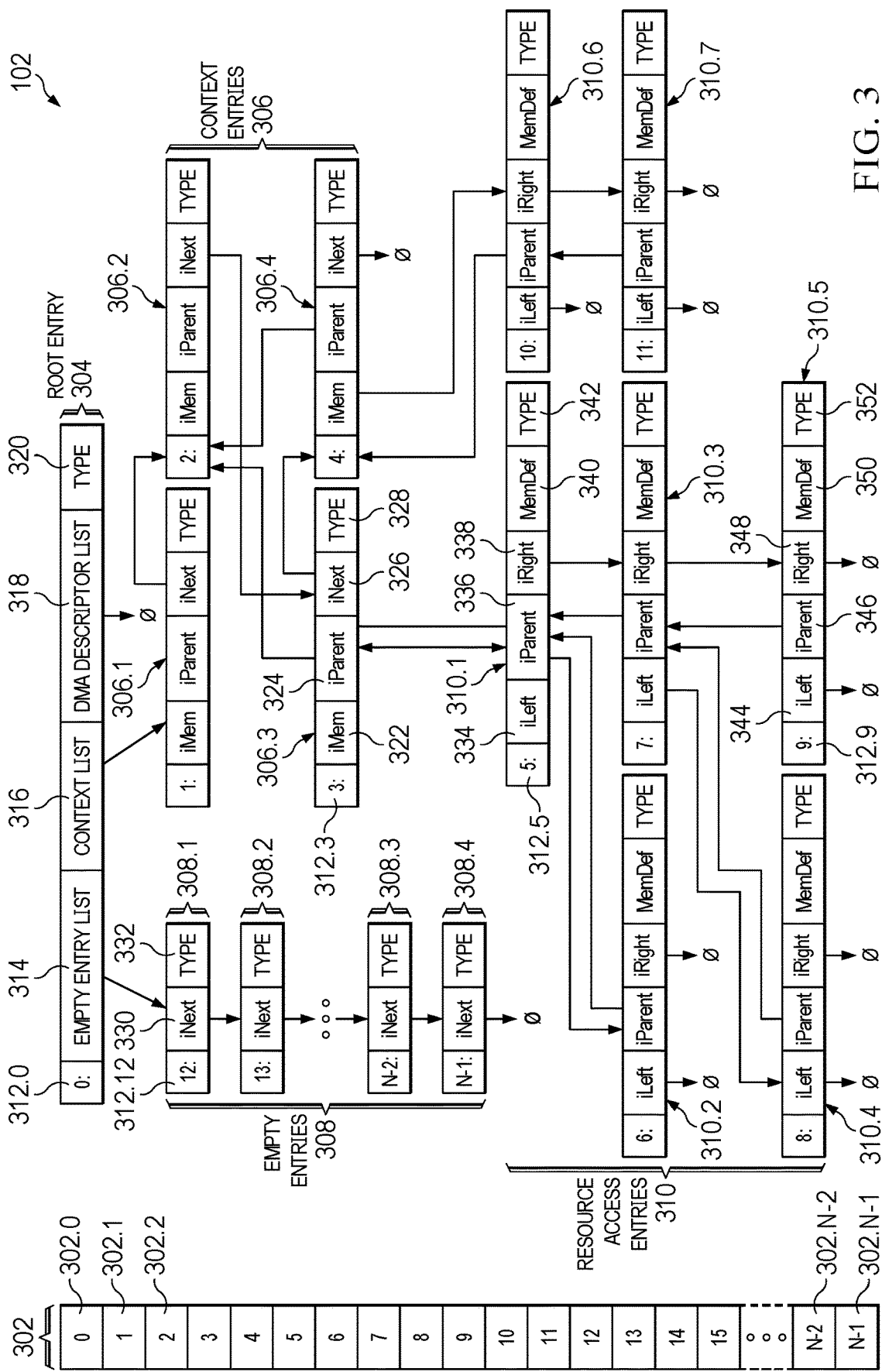
FIG. 3 is a rulebook for storing access control rules in accordance with various examples.

FIG. 3 is a rulebook 102 for storing access control rules in accordance with various examples herein. Rulebook 102 may be an SRAM in one example, with the SRAM rows and entries organized as described herein. A hardware accelerator may 114 perform the operations on rulebook 102 described herein. The access control rules in rulebook 102 are stored in a binary tree format, which provides for quick search and retrieval. Linked lists are also useful in rulebook 102 as described below. Rulebook 102 includes N rows 302, which are numbered from 0 to N as shown. Row 0 is 302.0, row 1 is 302.1, and so on to row 302.N-1 for row N−1. Rows 302 may be referred to collectively as rows 302 or individually as a row 302. The entries in rulebook 102 are a fixed width in this example. The entries have various subfields as described herein, depending on the type of entry. Rulebook 102 includes a root entry 304, context entries 306, empty entries 308, and resource access entries 310. Root entry 304 includes a row indicator 312 (in this case, 312.0 to indicate the $0^{th}$ row of the SRAM), empty entry list pointer 314, context list pointer 316, DMA descriptor list 318, and attribute 320 (e.g., type, which indicates the type of entry or an attribute of an entry).

Four context entries 306 are shown in FIG. 3 (306.1, 306.2, 306.3, and 306.4). The context entries 306 may be stored in consecutive rows in the SRAM in this example, although they do not have to be stored in consecutive rows in the SRAM in other examples. Each context entry 306 corresponds to a specific context, such as a software program running on a CPU. Context entries 306 may also include an entry 306 for each task or other requesting entity. These entries 306 are labeled context entries herein for simplicity, even though they may apply to tasks or any other requesting entity. Context entries 306 each have five subfields. Context entry 306.3 is the only context entry 306 in FIG. 3 with labeled subfields for simplicity, but the other context entries 306 have similar subfields. Context entry 306.3 includes a row indicator 312.3, which indicates context entry 306.3 is stored in row 3 of the SRAM. As shown in FIG. 3, context entry 306.1 is stored in row 1, context entry 306.2 is stored in row 2, and context entry 306.4 is stored in row 4. Context entry 306.3 includes iMem 322, which is a pointer to the first rule for context entry 306.3. Context entry 306.3 includes iParent 324, which is a pointer to a parent entry (in this example, iParent 324 points to context entry 306.2). Context entry 306.3 includes iNext 326, which is a pointer to a next entry (in this case, iNext 326 points to context entry 306.4). Context entry 306.3 includes attribute 328 (e.g., the type of entry).

Four empty entries 308 are shown (308.1, 308.2, 308.3, and 308.4). Empty entries 308 are SRAM rows that do not currently have rules stored in them. Rules may be added to these empty entries 308 for any context, and the linked lists and binary tree structure described herein are used to organize the entries. Empty entry 308.1 is the only empty entry 308 in FIG. 3 with labeled subfields for simplicity, but the other empty entries 308 have similar subfields. Empty entry 308.1 includes a row indicator 312.12, which indicates empty entry 308.1 is stored in row 12 of the SRAM. In this example, empty entry 308.2 is stored in row 13, empty entry 308.3 is stored in row N-2, and empty entry 308.4 is stored in empty entry N-1. Empty entry 308.1 includes iNext 330, which is a pointer to the next empty entry. Empty entry list pointer 314 points to iNext 330 as shown in FIG. 3. Empty entry 308.1 includes attribute 332 (e.g., type, which indicates this is an empty entry). Each empty entry 308 uses its iNext 330 subfield to point to the next empty entry 308 in a linked list, so the empty entries may be easily found and selected if a new rule is to be stored in rulebook 102.

Rulebook 102 includes resource access entries 310 (e.g., access control rules). Resource access entries 310 are the rules for memory access for the various contexts in system 100. Each resource access entry 310 (e.g., each rule) is stored in a row in the SRAM. In this example, seven resource access entries 310 are shown (310.1, 310.2, 310.3, 310.4, 310.5, 310.6, and 310.7.). These example resource access entries 310 are stored in rows 5 through 11 of the SRAM in this example, although they do not have to be stored in consecutive rows in the SRAM in other examples. In FIG. 3, only the subfields for resource access entries 310.1 and 310.5 are individually labeled, but the other resource access entries 310 have similar subfields.

Resource access entry 310.1 includes a row indicator 312.5, which indicates that resource access entry 310.1 is stored in row 5. Resource access entry 310.1 includes an iLeft subfield 334, which points to a resource access entry 310 to the left (in this case, resource access entry 310.2). Resource access entry 310.1 includes an iParent subfield 336, which points to a parent entry. In this example, context entry 306.3 is the parent entry for resource access entry 310.1, which indicates resource access entry 310.1 is a stored rule for context entry 306.3. Resource access entry 310.1 includes an iRight subfield 338, which points to a resource access entry 310 to the right (in this case, resource access entry 310.3). Resource access entry 310.1 includes MemDef 340, which indicates the memory access location and attribute privileges associated with the rule stored in resource access entry 310.1. Resource access entry 310.1 also includes attribute 342. Attribute 342 includes the type of memory access rule, such as range-based access entry, block-based access entry or peripheral access entry, etc.

The location of a resource access entry 310 to the left or right of another resource access entry 310 indicates the memory access location for the rule. For example, rule 310.1 may cover the memory access rule for context 3 (context entry 306.3) with respect to memory locations 1000 to 2000. Therefore, iLeft subfield 334 points to any rules that cover memory locations less than 1000 (such as resource access entry 310.2). iRight subfield 338 points to any rules that the cover memory locations greater than 2000 (such as resource access entry 310.3). There could be no rules to the right or the left of any given resource access entry 310, or there could be multiple rules arranged as shown in FIG. 3. With the binary tree structure shown here, searching a number N of rules takes $\log_2$ (N) searches rather than N searches.

In this example, resource access entry 310.2 has no right or left rules below it in the tree structure. Resource access entry 310.3 has a left rule (310.4) and a right rule (310.5) below it. Resource access entries 310.2, 310.4, and 310.5 have no resource access entries below them. Therefore, the respective iLeft and iRight subfields in those entries indicate a null notation (Ø) in FIG. 3. In one implementation, the null points back to address 0 in SRAM—the root entry.

Resource access entry 310.5 includes a row indicator 312.9, which indicates that resource access entry 310.5 is stored in row 9. Resource access entry 310.5 includes an iLeft subfield 344, which is null. Resource access entry 310.5 includes an iParent subfield 346, which points to a parent entry. In this example, resource access entry 310.3 is the parent entry for resource access entry 310.5, which indicates context resource access entry 310.5 is a stored rule for a memory access location to the right of the MemDef location in resource access entry 310.3. Resource access entry 310.5 includes an iRight subfield 348, which is null. Resource access entry 310.5 includes MemDef 350, which indicates the memory access location associated with the rule stored in resource access entry 310.5. Resource access entry 310.5 also includes attribute 352.

In one example operation, the contexts are stored in the first X number of rows in the rulebook 102. The identifier of the context is the location of the context in the rulebook 102. If a firewall 108 receives an access request from context ID 5, the firewall 108 can query the rulebook 102 using context ID 5. The hardware accelerator 114 does not have to perform another mapping to find the context entry 306 in rulebook 102, but can instead just use the context ID (5) from firewall 108. Therefore, only one access within the SRAM is used to get to the requested context in rulebook 102. This example enables faster searching.

As shown in FIG. 3, context entry 306.3 has five resource access entries 310 in its tree (310.1, 310.2, 310.3, 310.4, and 310.5). Context entry 306.4 has two resource access entries 310 in its tree (310.6 and 310.7). The resource access entries 310 may be stored anywhere in rulebook 102, and do not have to be in consecutive rows. As rules and contexts are added and removed from system 100, the contexts and rules will likely be located throughout rulebook 102 in no particular order. The context entries 306 also do not have to be in consecutive SRAM rows/locations either. The context entries 306 may be part of a doubly linked list, the head of which is given in the root entry at row/location 0 in rulebook 102. The root entry 304 may be the only entry with a fixed row/entry in an example, and its numeric location (0) allows a pointer with value 0 in any other entry to be interpreted as a null pointer (e.g., nothing points to the root entry 304).

In an example search operation, the search can be stopped after a rule is found for a particular memory location. The rest of the resource access entry tree does not have to be searched. If no rule is found for a given context and a given memory location, a fault could be sent back to the context (e.g., no access is allowed for this memory location).

Rulebook 102 may also store common or shared resources in a tree of resource access entries 310 (not shown in FIG. 3). The common resources may be memory locations that are accessible by any given context or task, with a tree of rules stored in rulebook 102 that govern the access permissions for these memory locations. In another example, a tree of secured resource access entries 310 may be stored in rulebook 102 (not shown in FIG. 3). If a memory access rule for a given context is not found in a tree of resource access entries 310 specific to that context, the secured resources and the common resources could then be searched for a memory access rule.

The entries in rulebook 102 may include a few bits to indicate the type of entry: empty, context, resource access, etc.). The context entries 306 may include a linked list, and the empty entries 308 may include a linked list. Another feature of rulebook 102 is that mixed rule types may be stored. One tree of resource access entries 310 for a given context provides access rules for every type of rule (range-based, block-based, or peripheral). Rulebook 102 may also handle overlapping entries, described below. In another example, some contexts may have a parent, such as context A and context B associated with one CPU. These contexts may share and inherit rules. Therefore, a linking would link the context to a parent (not shown in FIG. 3). Multiple groups of parents and contexts could be formed. As an example, context 1 could be a parent to contexts 3 and 4. Contexts 3 and 4 would each have unique rules but could also inherit rules associated with context 1. Therefore, rules that are common to multiple contexts would not have to be duplicated in rulebook 102, which reduces storage requirements.

Figure 4:
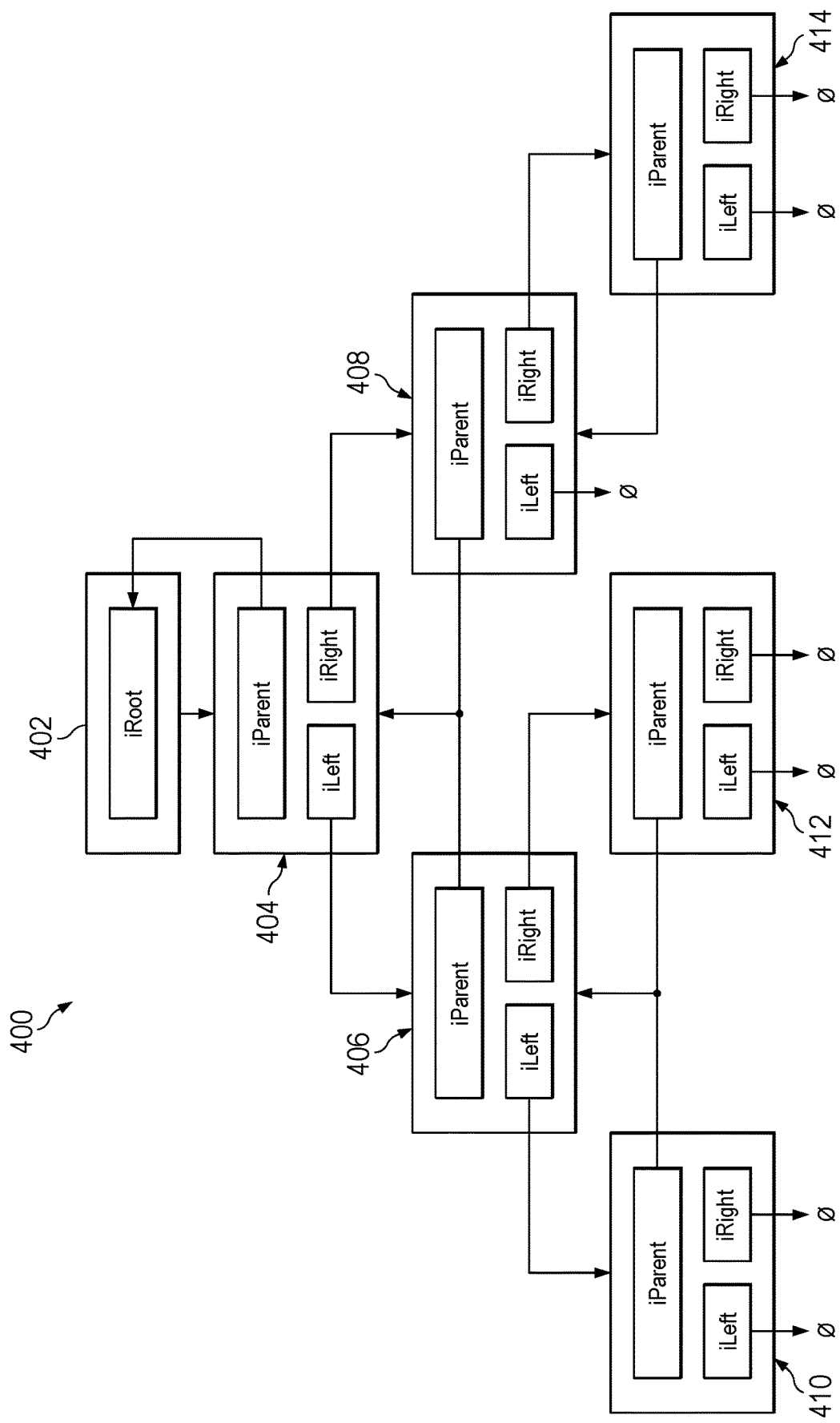
FIG. 4 is a binary search tree in accordance with various examples.

FIG. 4 is a binary search tree 400 in accordance with various examples herein. A binary search tree organizes data in a sorted tree structure that allows logarithmic time searches. Binary search tree 400 includes a root node 402 and nodes 404, 406, 408, 410, 412, and 414. Root node 402 points to node 404, and node 404 includes a parent entry that points back to root node 402. Each node 404, 406, 408, 410, 412, and 414 includes a parent entry that points to its parent, and left and right entries. The left and right entries point to nodes to the left and right if any are present. As an example, node 404 points to left node 406 and right node 408. Left node 406 has a parent entry that points back to node 404. Right node 408 has a parent entry that points back to node 404. Nodes 406, 408, 410, 412, and 414 each have parent entries that point to their respective parent, and left and right nodes that point to left and right nodes, if any. Some left and right entries may be null, such as the left and right entries for nodes 410, 412, and 414, or the left entry for node 408. The binary search tree structure maintains the property that each node's entry (e.g., its memory access location) is greater (or equal) to the entry of all nodes in its left subtree and is lesser to all entries in nodes in its right subtree. Examples of this organizational structure is described below.

Insertions and removals of entries in the binary search tree 400 may be performed as memory access rules are updated. A binary tree can become unbalanced after many insertions and removals which could increase search time. To avoid this, a background process may balance the trees if no other operations are running.

In order to be efficiently searchable, data structures should maintain an ordering of their entries. The entries should be ordered by a key value. In examples herein, the key value is the memory address location associated with the access control rule. However, some address locations include address ranges, and possibly overlapping ranges, rather than discrete values that make up the key. In some examples, the ordering rules for access entries A and B need is that A<B if the start address of A is lower than the start address of B.

In the absence of overlapping entries, this rule is sufficient to uniquely determine how to proceed at each stage in the search. One example search can be implemented as described below.

Figure 5:
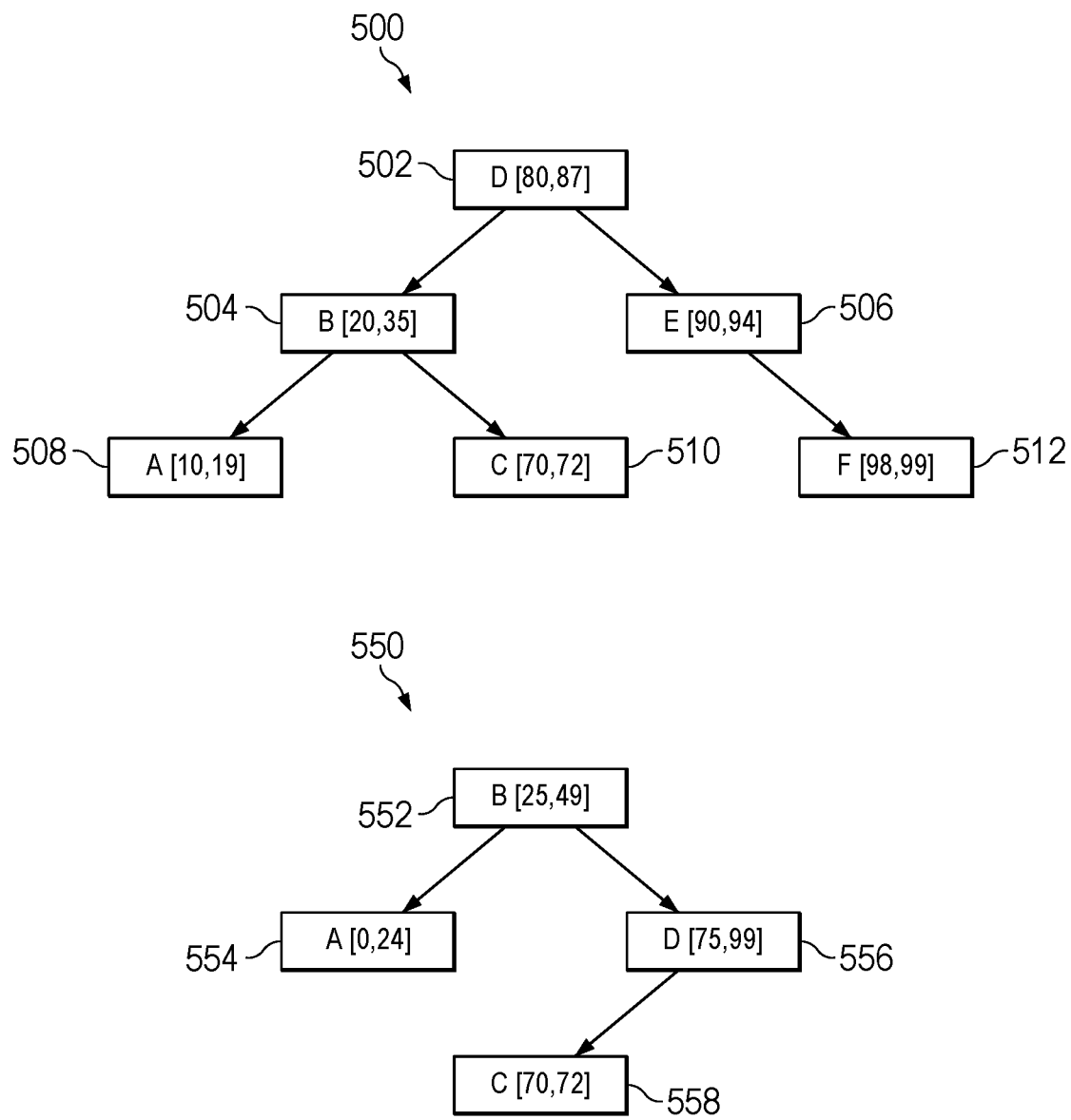
FIG. 5 shows two example data structures with non-overlapping entries in accordance with various examples.

FIG. 5 shows two example data structures with non-overlapping entries in accordance with various examples herein. Data structure 500 includes entries 502, 504, 506, 508, 510, and 512. Data structure 550 includes entries 552, 554, 556, and 558.

In data structure 500, entry 502 includes address ranges 80 to 87. Entries 504, 508, and 510 are to the left of entry 502, and are therefore lower than the beginning range of entry 502 (80). Entry 504 includes address ranges 20 to 35. Entry 508 is to the left of entry 504, and includes address ranges lower than 20 (e.g., 10 to 19). Entry 510 is to the right of entry 504 and includes address ranges higher than 35 (e.g., 70 to 72).

Entries 506 and 512 are to the right of entry 502, and are therefore higher than the ending range of entry 502 (87). Entry 506 includes address ranges 90 to 94. Entry 512 is to the right of entry 506, and includes address ranges 98 to 99.

In data structure 550, entry 552 includes address ranges 25 to 49. Entry 554 is to the left of entry 552, and is therefore lower than the beginning range of entry 552 (25). Entry 554 includes address ranges 0 to 24. Entry 556 is to the right of entry 552 and is therefore higher than the ending range of entry 552 (49). Entry 556 includes address ranges 75 to 99. Entry 558 is to the left of entry 556 and is therefore lower than the beginning range of entry 556 (75). Entry 558 includes address ranges 70 to 72.

In one example search algorithm, a context (such as context 5) tries to make an access to a memory address location, such as address 5000. First, context 5 is accessed in rulebook 102 (which may be row 5 in rulebook 102 in one example). The resource tree is encoded in the iMem field (such as iMem subfield 322 in FIG. 3). The iMem subfield points to the start of the resource tree, which may start at any row in the rulebook 102, such as row 8.

Row 8 may contain a resource access entry 310, which includes a MemDef subfield that indicates the range. For a range-based search, the node's beginning and ending address are in the MemDef field. If the requested address (e.g., 5000) is between the beginning and ending address, rule is returned by the firewall 108 to the requesting context.

For a block-based entry (with 64 kb-sized blocks) in the resource access entry 310, the entry's base address is retrieved as a start point. The end point is the base address plus 64 times the blocksize. Then, the requested address (e.g., 5000) is compared to determine if it is within this range. If so, a rule is returned to context 5.

For the range-based search, if no match is found, the requested address is checked to determine if it is lesser than the beginning address or higher than the ending address. If it is lesser, the process proceeds to the left branch of the tree. If it is higher, the process proceeds to the right branch of the tree. If a match is not found, but it is determined that the next node is a null node, the search is terminated and an error or null notification is returned to context 5.

A similar procedure is useful for the block-based search. If the requested address (e.g., 5000) is less than base address, go to the left branch. If the requested address is higher, go to the right branch. If the next node is eventually found to be a null, an error or null notification is returned to context 5.

Overlapping entries may introduce extra complexity in the search. Different access control rules may have overlapping memory ranges, such as rule A that provides an access rule for range 0 to 100 and rule B that provides an access rule for range 50 to 150 with different attribute privileges. It may not be possible to strictly order all the entries in a way that makes the procedures described above useful. Additional ordering rules may be useful that are slightly different for linked lists and trees. First, A<B if the start address of A is lower than the start address of B. Second, A<B if the end address of A is lower than the end address of B and they have the same start address. If A is a block-based access entry, it is ordered earlier than any range based entries that overlap any part of its reach. For a linked list, earlier means before in the list, and later means after in the list.

For a binary search tree, earlier means that all range-based entries must have the block-based access entry they overlap as an ancestor. Later entries indicate all descendants of the block-based access entry.

Also, A=B if two block/peripheral entries have the same base address (but different attributes). All such equal entries are placed in the left branch of the first block entry without any intervening nodes in a supernode. Only the top entry in a supernode is allowed to have right branches to avoid the need for multiple bookmarks. Bookmarks are useful for jumping back up the tree to continue a search if no matching entry is found.

Figure 6:
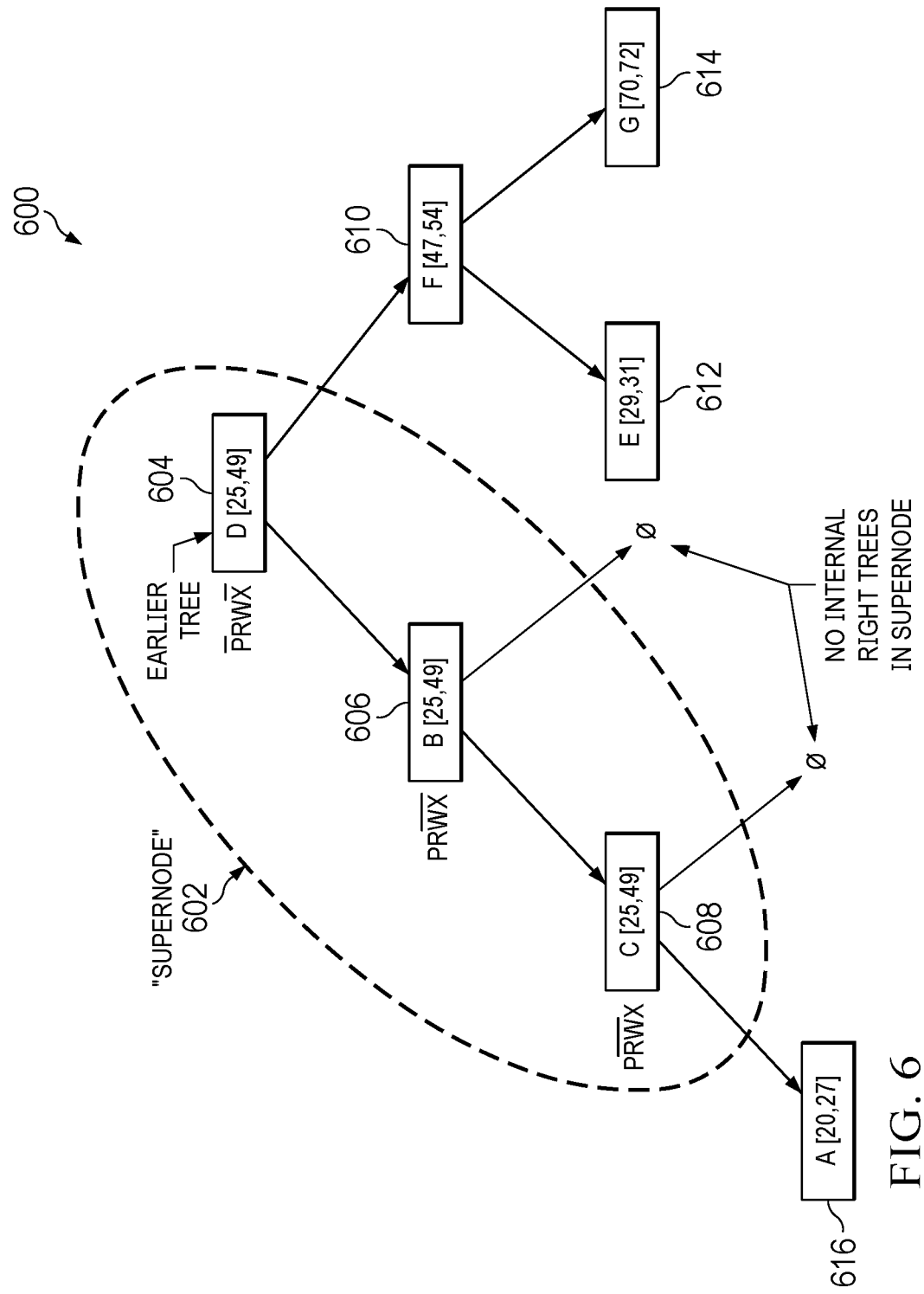
FIG. 6 is a data structure with overlapping entries in accordance with various examples.

FIG. 6 is a data structure 600 with overlapping entries in accordance with various examples herein. Data structure 600 includes supernode 602. Data structure 600 also includes block-based entries 604, 606, and 608. Data structure 600 includes range-based entries 610, 612, 614, and 616. Data structure 600 also shows various attributes for the block-based entries, noted by PRWX (which indicates read, write, executable, etc.). Block-based entry 604 has R and W permissions, block-based entry 606 has P and R permissions, and block-based entry 608 has P and X permissions for the specific shaded blocks.

One example process for searching overlapping entries starts with block based entry 604 (blocks 25-49). The permission indicated by entry 604 is only allowed for the shaded blocks. However, a write permission might exist in another region, such as 20 to 27, which is found in range-based entry 616. If an access for block 48 was requested, but was not found in block-based supernode 602, the process may not know which way to proceed if using the non-overlapping process described above. Therefore, for overlapping entries, a bookmark is placed in block-based entry 604. The left branch below block-based entry 604 is searched first. If no access control rule is found, the process proceeds back to the bookmark and then down the right path (range-based entries 610, 612, and 614).

For an overlapping search, the search is continued until (1) a positive range-based match is found, or (2) the address falls within the address reach of a block-based/peripheral access entry. If (1), a result is returned to the context by the firewall 108. If (2), and if the entry has a positive block access and attribute match, then a result is returned. If (2) and no positive block index match is found, the entry is bookmarked and later entries are searched. The later entries are searched in the left branch until one of three results occurs. First, if a second block-based/peripheral block entry that has the same address reach is found in the left subtree and it has a positive block match, then return the result. Second, if a positive range-based match is found, then return the result. Third, if the end of the left subtree is found, then go to back to the bookmarked entry and search the right branch until a positive address match is found in a resource entry. But finally, if the end of the resource set is encountered in the right subtree as well without a match, then return an error or no access to the context.

Figure 7:
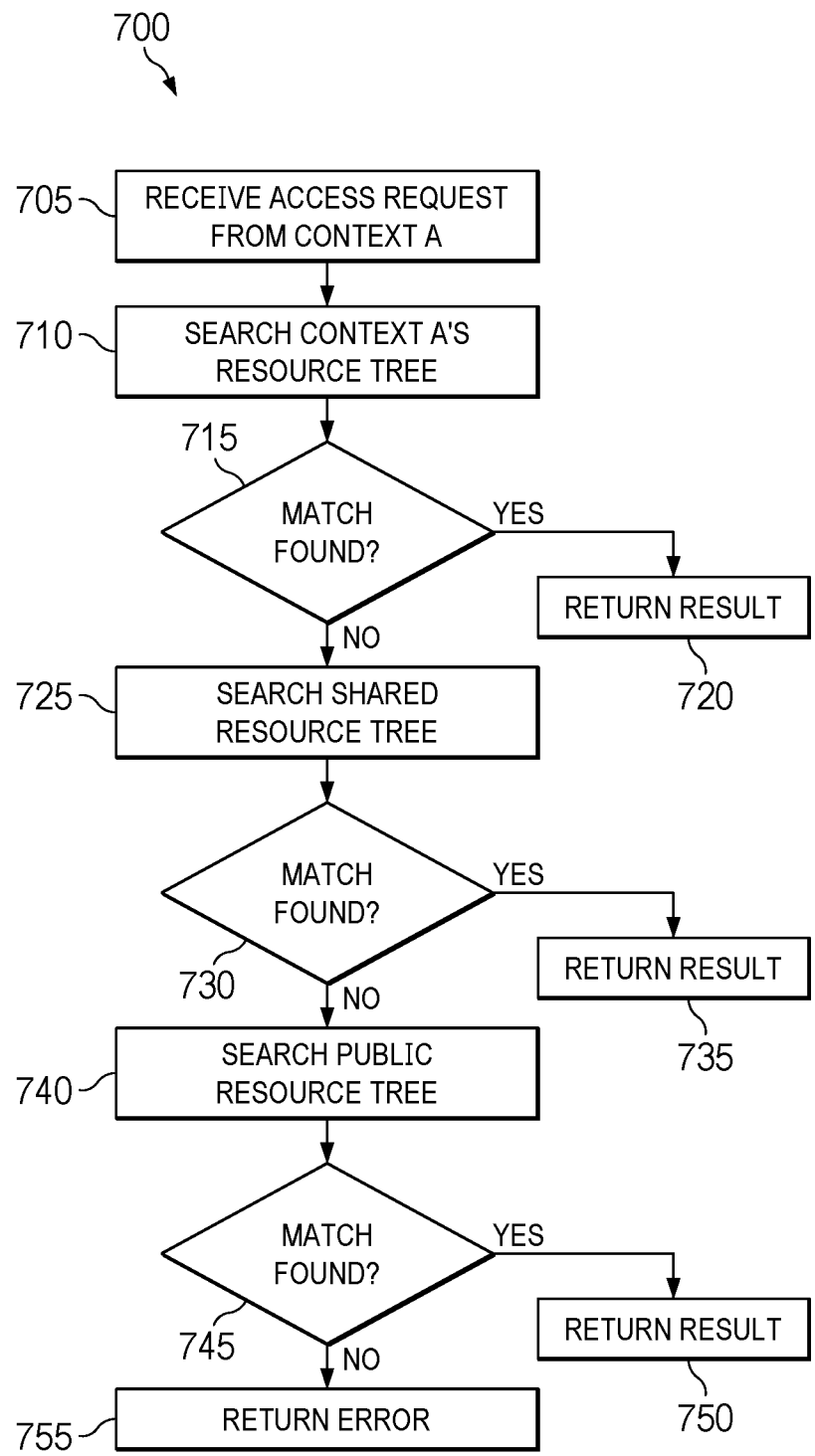
FIG. 7 is flow diagram of a method for searching across trees in accordance with various examples.

FIG. 7 is a flow diagram of a method 700 for searching across trees in accordance with various examples herein. The steps of method 700 may be performed in any suitable order. The hardware components described above with respect to FIGS. 1 and 3 may perform method 700 in some examples. Any suitable hardware, software, or digital logic may perform method 700 in some examples.

Method 700 begins at 705, where an access request for a memory 106 is received from context A. The access request is provided to a firewall 108. In other examples, the firewall 108 searches all its cached entries (in parallel) for a positive match. If no match is found, the hardware accelerator 114 is notified. The hardware accelerator 114 reads the pertinent details about the access request (address, R/W/X attributes, context ID, etc.) from the firewall 108. In one example, the hardware accelerator 114 may maintain a first-come, first-serve queue in case multiple firewalls 108 need rule lookups simultaneously.

Method 700 continues at 710, where the hardware accelerator 114 searches context A's resource tree in rulebook 102. The search may be performed using the procedures described above.

Method 700 continues at 715, where it is determined if a match is found. If so, method 700 proceeds to 720 and returns a result to context A. If no match is found, method 700 proceeds to 725.

At 725, a shared resource tree is searched by the hardware accelerator 114, if a match was not found in context A's resource tree above.

Method 700 continues at 730, where it is determined if a match is found in the shared resource tree. If so, method 700 proceeds to 735 and returns a result to context A. If no match is found, method 700 proceeds to 740.

At 740, a public resource tree is searched by the hardware accelerator 114, if a match was not found in context A's resource tree or in the shared resource tree.

Method 700 continues at 745, where it is determined if a match is found in the shared resource tree. If so, method 700 proceeds to 750 and returns a result to context A. If no match is found, method 700 proceeds to 755 and returns an error to context A to indicate that no access rule was found for the requested memory location.

A number of services may be provided in accordance with various examples herein. The services utilize the above-described hardware and procedures to support the services. A first service is for a query whether a rule is present in rulebook 102. A requesting entity, such as a context or a firewall 108, may provide a context ID, address, and attributes and query whether an access control rule exists for those criteria. If the access control rule exists, the details of the access control rule are provided back to the requesting entity. If no access control exists, a notification is returned that the rule was not found. This service may use the search procedures described above.

A second service is a query whether an address range may be accessed by a context. A requesting entity provides a context ID, address range, and attributes, and queries if the entire range may be accessed by the entity. This range may not be covered by a single access control rule. Therefore, the search algorithm may be called repeatedly until the entire range is covered. For example, the process may start with a starting address of 20 for a range of 20 to 100. If a rule is found that covers access for addresses 20 to 27, then the process searches for a rule for address 28. If a rule is found for 28, save the result and then proceed to address 29. The process continues until the entire range is covered. If a rule is not found for a given address in the range of 20 to 100, return a message that the entire range is not covered by the requesting entity. If rules are found for the entire range 20 to 100, return to the requesting entity that access is allowed for the entire range. In one implementation, the search is abandoned at a location (such as 28) if a rule covering this address is not found in the context's resource tree, and a negative response is returned. The search continues only on a positive match of the address/address range within 20 to 100.

If there are shared trees with access control rules, the first and second services above are performed first on the resource access tree for the requesting entity and then on the shared trees. The services may also be performed on public resource trees in some examples.

A third service is for a requesting entity to provide a range of addresses and attributes, and then query if any context has access to any sub-region within the queried range. The search procedure may check every non-empty entry in the RAM and identify if there is any context with allowed access to the queried range. The first match that is found terminates the search. The rulebook 102 may be organized in such a way that access control rules are grouped together with a boundary marker so unnecessary queries to invalid entries can be avoided.

Examples herein provide for dynamic rule modification without supervision by centralized secure software. As a SOC begins operating, a specific memory address region may be owned by a context A. That rule may be dynamically provided to another context B. One example is that context A could share its memory region with context B. The access control rule could be present in trees for both context A and context B. In one tree (context A), the access control rule would have R/W/X permissions, etc., and in the other tree (context B) no permissions would be present for the access control rule. Therefore, a dummy entry is present in the tree for context B. Context A executes a command in rulebook 102 to share the memory address region with context B. The hardware accelerator 114 checks if context A has the necessary permissions (such as r/w/x/sharable). If so, the hardware accelerator 114 accesses the dummy entry for context B and updates the permissions so context B now has access. In another example, to avoid the predetermined dummy entries, the hardware accelerator 114 could create a copy of context A's rule in an empty entry 308 and insert the rule into the resource tree of context B. This operation could also be paired with a "remove rule" operation that removes the rule from context A's tree.

In another example, a block-based memory range may act as a shared memory pool. Each context has a block-based entry for the given memory range, but none of the block bits are set. Instead, a context called a memory allocator context has all the relevant block bits set. The memory allocator context therefore owns all of the blocks. A context that requests access may be given access to different blocks from the pool of memory. This may be achieved by clearing the block bit for the memory allocator context and setting the block bit for the target context. The target context gives back ownership to the memory allocator context when the target context is finished with its access.

Another example is a mailbox operation between two contexts. Two contexts may alternately have read-only and read/write access to a region of memory for implementing a tamper-safe mailbox mechanism. A common shared memory is written by one context, who then gives the write permission to a second context. The write privilege is passed back and forth between the two contexts.

Figure 8:
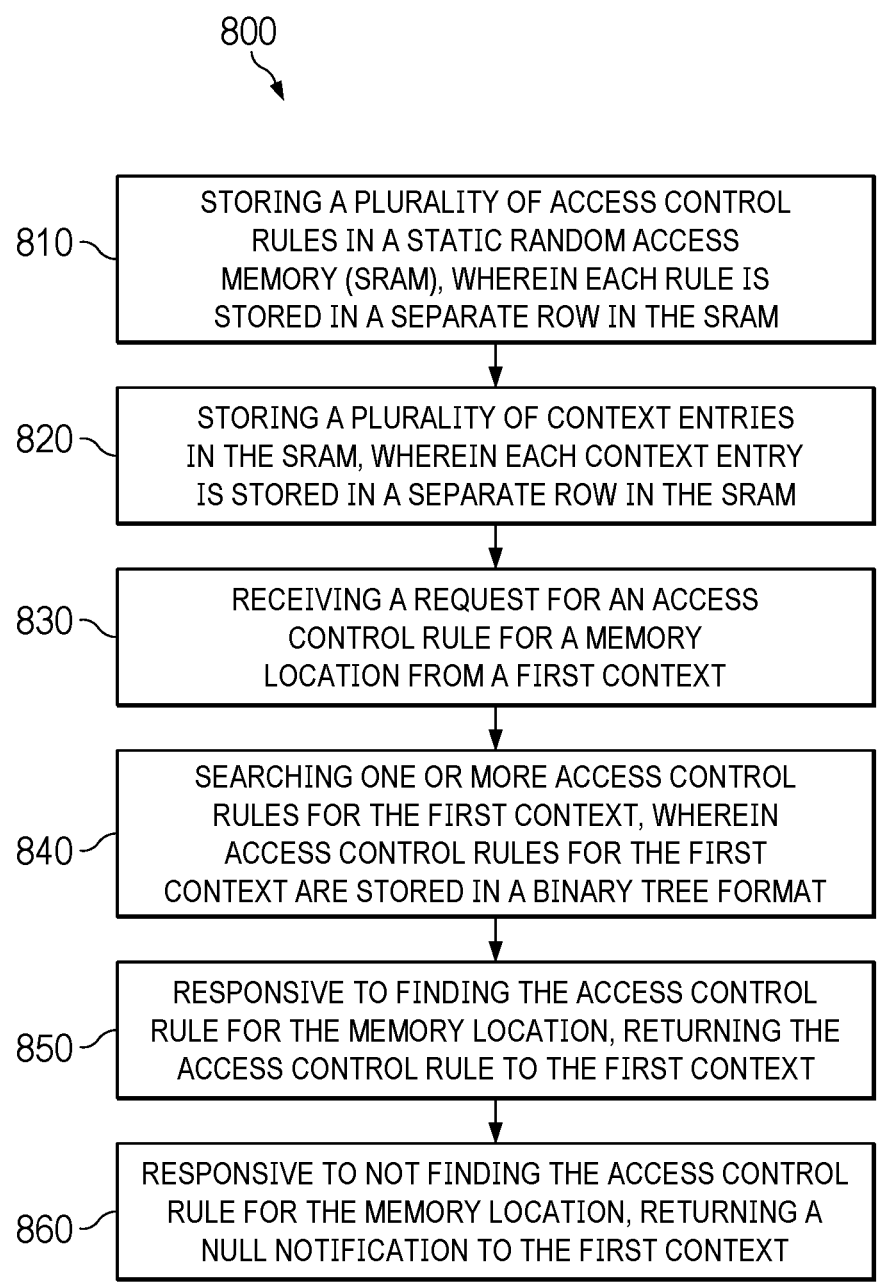
FIG. 8 is a flow diagram of a method for retrieving access control rules in accordance with various examples.

FIG. 8 is a flow diagram of a method 800 for retrieving access control rules in accordance with various examples herein. The steps of method 800 may be performed in any suitable order. The hardware components described above with respect to FIGS. 1 and 3 may perform method 800 in some examples. Any suitable hardware, software, or digital logic may perform method 800 in some examples.

Method 800 begins at 810, where an SRAM stores a plurality of access control rules, and where each rule is stored in a separate row in the SRAM. Resource access entries 310 in rulebook 102 are the access control rules.

Method 800 continues at 820, where the SRAM stores a plurality of context entries, where each context entry is stored in a separate row in the SRAM. As shown in FIG. 3, context entries 306 represent the plurality of contexts or other requesting entities (such as tasks).

Method 800 continues at 830, where a hardware accelerator 114 receives a request for an access control rule for a memory location from a first context. A firewall may forward the request from the context to the hardware accelerator 114. The hardware accelerator 114 manages the SRAM and will perform the queries of the SRAM in an example.

Method 800 continues at 840, where the hardware accelerator 114 searches one or more access control rules for the first context, where the access control rules for the first context are stored in a binary tree format. Example binary tree formats are described above. Also, various search procedures are described above.

Method 800 continues at 850 where, responsive to finding the access control rule for the memory location, the hardware accelerator 114 returns the access control rule to the first context. The access control rule may be returned to a firewall 108 in some examples.

Method 800 continues at 860, where responsive to not finding the access control rule for the memory location, the hardware accelerator 114 returns a null notification to the first context. The null notification may be returned to a firewall 108 in some examples.

Figure 9:
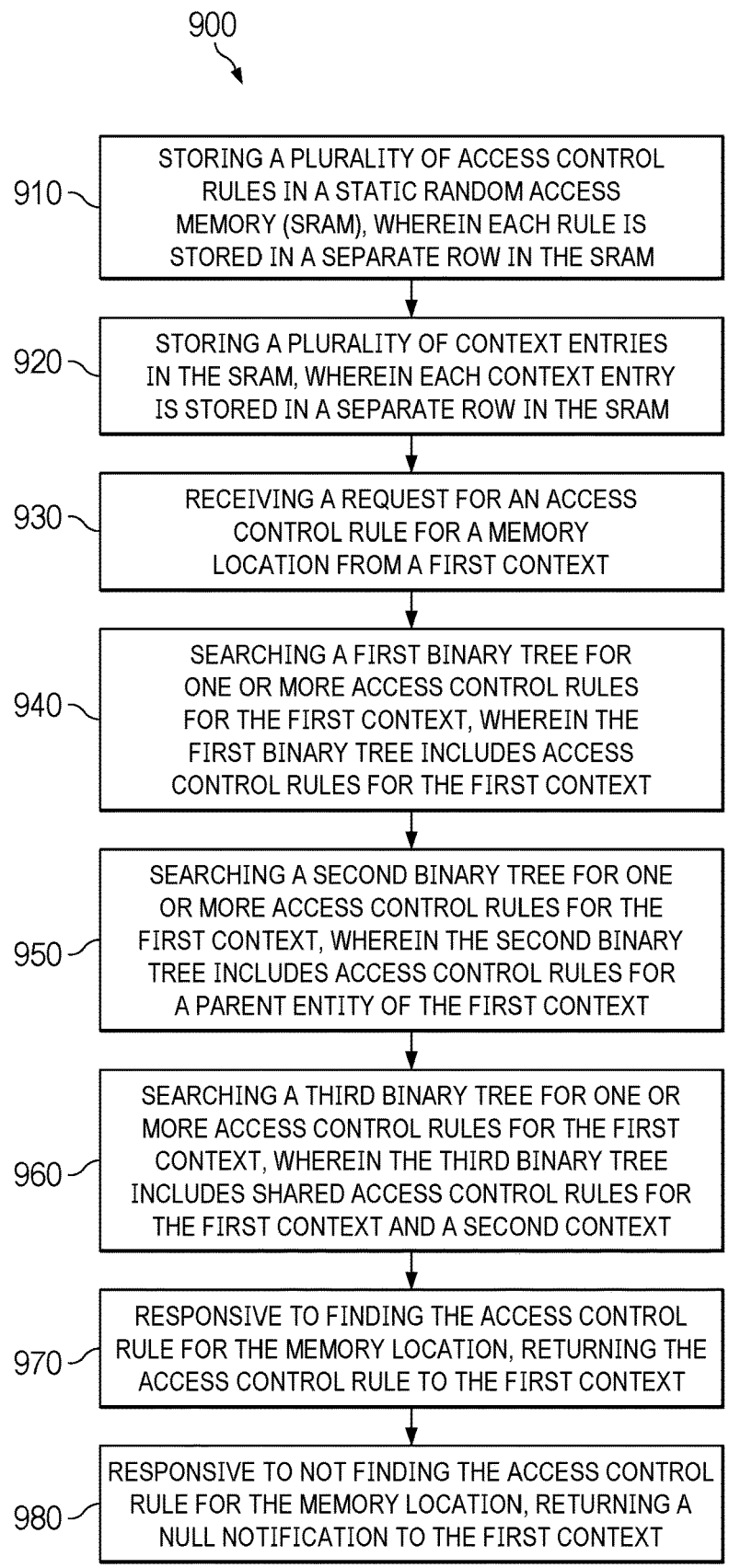
FIG. 9 is a flow diagram of a method for retrieving access control rules in accordance with various examples.

FIG. 9 is a flow diagram of a method 900 for retrieving access control rules in accordance with various examples herein. The steps of method 900 may be performed in any suitable order. The hardware components described above with respect to FIGS. 1 and 3 may perform method 900 in some examples. Any suitable hardware, software, or digital logic may perform method 900 in some examples. In method 900, a binary tree for the first context is searched, then a binary tree for a parent entity, then a binary tree for shared access control rules. However, in other examples, any type of binary tree(s) may be searched in any order. For example, a binary tree for the first context may be searched first, and then a binary tree for public resources may be searched.

Method 900 begins at 910, where an SRAM stores a plurality of access control rules, where each rule is stored in a separate row in the SRAM. Resource access entries 310 in rulebook 102 are the access control rules.

Method 900 continues at 920, where the SRAM stores a plurality of context entries, where each context entry is stored in a separate row in the SRAM. As shown in FIG. 3, context entries 306 represent the plurality of contexts or other requesting entities (such as tasks).

Method 900 continues at 930, where a hardware accelerator 114 receives a request for an access control rule for a memory location from a first context. A firewall may forward the request from the context to the hardware accelerator 114. The hardware accelerator 114 manages the SRAM and will perform the queries of the SRAM in an example.

Method 900 continues at 940, where the hardware accelerator 114 searches a first binary tree for one or more access control rules for the first context, where the first binary tree includes access control rules for the first context. If an access control rule is found, it may be returned to the requesting context without performing additional searches.

Method 900 continues at 950, where the hardware accelerator 114 searches a second binary tree for one or more access control rules for the first context, where the second binary tree includes access control rules for a parent entity of the first context. The second binary tree may be searched, in one example, if an access control rule was not found in the first binary tree. It may not always be the case that the child context would inherit all privileges that the parent context has. In one example implementation, a search is carried out within a context's own tree first, a shared tree next, and a public tree last.

Method 900 continues at 960, where the hardware accelerator 114 searches a third binary tree for one or more access control rules for the first context, where the third binary tree includes shared access control rules for the first context and a second context. The third binary tree may be searched, in one example, if an access control rule was not found in the first or second binary tree.

Method 900 continues at 970, where responsive to finding the access control rule for the memory location, the hardware accelerator 114 returns the access control rule to the first context. The access control rule may be returned to a firewall 108 in some examples.

Method 900 continues at 980, where responsive to not finding the access control rule for the memory location, the hardware accelerator 114 returns a null notification to the first context. The null notification may be returned to a firewall 108 in some examples.

In other examples, two levels of inheritance are supported: parent and child. A CPU in the system may have one parent context that has the highest privilege level possible. Every other context is a child of that context, but may have varying levels of privilege. Because a parent context has no parent itself, the parent context instead has a pointer to a public resource tree. Resources specified in the public resource tree may be inherited by all the parent's children, and searched last. A child context may have a pointer to its single parent (and thus indirectly to its public resource tree).

A shared feature may be considered by the resource tree searches. The shared feature is a way to specify two simultaneous current contexts: the actual (primary) context running and a "shared library" (secondary) context. The secondary context may be selectively configured when context switching, allowing some subset of child contexts to access some shared resources. The secondary context is searched if the primary context's resource tree has no matching entry. In some examples, for security reasons, a shared library/secondary context is only allowed if the primary context is non-secure, to avoid any kind of unintended data leakage between secure and non-secure contexts.

The examples described herein provide a quick and efficient search of access permissions to an address or a range of addresses. In one example, the context ID takes on the memory index in the SRAM of the rulebook 102, which provides zero cycle hardware access to the context rules in the SRAM. Different types of rules and granularities may be represented in the rulebook 102. Wide address ranges, non-contiguous blocks, or peripherals may each be covered by a single entry in the rulebook 102. The examples herein also provide an efficient hardware search procedure. Limited intermediate states are stored in the hardware, and tree traversal does not use large amount of memory (such as with a stack). A single hardware accelerator 114 provides firewall servicing and query operations, which is an area efficient solution. A state machine may be reused for searching and for the additional software operations described above. Support is provided for searching within overlapping ranges and block entries. Additionally, rule duplication is avoided by having a shared tree and a public tree of access control rules. The examples herein provide for dynamic rule modification. Memory regions may also be shared with other contexts.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

In this description, unless otherwise stated, "about," "approximately" or "substantially" preceding a parameter means being within +/−10 percent of that parameter. Modifications are possible in the described examples, and other examples are possible within the scope of the claims.

What is claimed is:

1. A method, comprising:
storing a plurality of access control rules in a static random access memory (SRAM), wherein each access control rule, of the plurality of access control rules, is stored in a different row in the SRAM with respect to rows in which the other access control rules, of the plurality of access control rules, are stored;
storing a plurality of context entries in the SRAM, wherein each context entry, of the plurality of context entries, is stored in a different row in the SRAM with respect to rows in which the other context entries, of the plurality of context entries, are stored;
receiving a request for an access control rule, of the plurality of access control rules, for a memory location from a first context;
searching one or more access control rules, of the plurality of access control rules, for the first context, wherein access control rules for the first context are stored in a binary tree format;
responsive to finding the access control rule for the memory location, returning the access control rule to the first context; and
responsive to not finding the access control rule for the memory location, returning a null notification to the first context.

2. The method of claim 1, wherein the plurality of context entries are stored in consecutive rows in the SRAM.

3. The method of claim 2, wherein an identifier (ID) for a context is equivalent to an SRAM row number where an associated context entry for the context is stored.

4. The method of claim 1, wherein the memory location is a range-based memory location.

5. The method of claim 1, wherein the memory location is a block-based memory location.

6. The method of claim 1, wherein the memory location is a peripheral memory.

7. The method of claim 1, wherein the request includes a query whether the first context can access a range of memory locations.

8. The method of claim 1, wherein the request includes a modification of the access control rule for the memory location.

9. The method of claim 1, wherein the access control rules for the first context includes rules with overlapping ranges of memory locations.

10. A system, comprising:
a static random access memory (SRAM) configured to:
store a plurality of access control rules, wherein each access control rule, of the plurality of access control rules, is stored in a different row in the SRAM with respect to rows in which the other access control rules, of the plurality of access control rules, are stored;
store a plurality of context entries, wherein each context entry, of the plurality of context entries, is stored in a different row in the SRAM with respect to rows in which the other context entries, of the plurality of context entries, are stored;
a controller configured to:
receive a request for an access control rule, of the plurality of access control rules, for a memory location from a first context;
search one or more access control rules, of the plurality of access control rules, for the first context, wherein access control rules for the first context are stored in a binary tree format;
responsive to finding the access control rule for the memory location, return the access control rule to the first context; and
responsive to not finding the access control rule for the memory location, return a null notification to the first context.

11. The system of claim 10, wherein the plurality of context entries are stored in consecutive rows in the SRAM.

12. The system of claim 11, wherein an identifier (ID) for a context is equivalent to an SRAM row number where an associated context entry for the context is stored.

13. The system of claim 10, wherein the memory location is a range-based memory location.

14. The system of claim 10, wherein the memory location is a block-based memory location.

15. The system of claim 10, wherein the memory location is a peripheral memory.

16. A method, comprising:
storing a plurality of access control rules in a static random access memory (SRAM), wherein each access control rule, of the plurality of access control rules, is stored in a different row in the SRAM with respect to rows in which the other access control rules, of the plurality of access control rules, are stored;
storing a plurality of context entries in the SRAM, wherein each context entry, of the plurality of context entries, is stored in a different row in the SRAM with respect to rows in which other context entries, of the plurality of context entries, are stored;
receiving a request for an access control rule, of the plurality of access control rules, for a memory location from a first context;
searching a first binary tree for one or more access control rules, of the plurality of access control rules, for the first context, wherein the first binary tree includes access control rules for the first context;
searching a second binary tree for one or more access control rules, of the plurality of access control rules, for the first context, wherein the second binary tree includes access control rules for a parent entity of the first context;
searching a third binary tree for one or more access control rules, of the plurality of access control rules, for the first context, wherein the third binary tree includes shared access control rules for the first context and a second context;
responsive to finding the access control rule for the memory location, returning the access control rule to the first context; and
responsive to not finding the access control rule for the memory location, returning a null notification to the first context.

17. The method of claim 16, wherein the plurality of context entries are stored in consecutive rows in the SRAM.

18. The method of claim 16, wherein the memory location is a range-based memory location.

19. The method of claim 16, wherein the memory location is a block-based memory location.

20. A system, comprising:
a static random access memory (SRAM) configured to:
store a plurality of access control rules, wherein each access control rule, of the plurality of access control rules, is stored in a different row in the SRAM with respect to rows in which other access control rules, of the plurality of access control rules, are stored;
store a plurality of context entries, wherein each context entry, of the plurality of context entries, is stored in a different row in the SRAM with respect to rows in which other context entries, of the plurality of context entries, are stored;
a controller configured to:
receive a request for an access control rule, of the plurality of access control rules, for a memory location from a first context;
search a first binary tree for one or more access control rules, of the plurality of access control rules, for the first context, wherein the first binary tree includes access control rules for the first context;
search a second binary tree for one or more access control rules, of the plurality of access control rules, for the first context, wherein the second binary tree includes access control rules for a parent entity of the first context;
search a third binary tree for one or more access control rules, of the plurality of access control rules, for the first context, wherein the third binary tree includes shared access control rules for the first context and a second context;
responsive to finding the access control rule for the memory location, return the access control rule to the first context; and
responsive to not finding the access control rule for the memory location, return a null notification to the first context.

21. The system of claim 20, wherein the request includes a query whether the first context can access a range of memory locations.

22. The system of claim 20, wherein the request includes a modification of the access control rule.

23. The system of claim 20, wherein the access control rules for the first context includes rules with overlapping ranges of memory locations.

* * * * *